(No Model.)

W. H. HAIRE.
KITCHEN CABINET.

No. 577,919. Patented Mar. 2, 1897.

Witnesses
A. C. Townsend
M. A. Kelly

Inventor
William H. Haire
By Dunst H. Mead
Attorney

UNITED STATES PATENT OFFICE.

WILLIAM H. HAIRE, OF BRISTOL, TENNESSEE.

KITCHEN-CABINET.

SPECIFICATION forming part of Letters Patent No. 577,919, dated March 2, 1897.

Application filed May 21, 1896. Serial No. 592,427. (No model.)

*To all whom it may concern:*

Be it known that I, WILLIAM H. HAIRE, a citizen of the United States, residing at Bristol, in the county of Sullivan and State of Tennessee, have invented certain new and useful Improvements in Kitchen-Cabinets; and I do hereby declare the following to be a full, clear, and exact description of the invention, such as will enable others skilled in the art to which it appertains to make and use the same.

This invention relates to kitchen-cabinets.

The object of the invention is to provide a kitchen-cabinet designed particularly for use in making bread and for holding kitchen utensils, which shall be so constructed as to retain all the materials and implements for mixing bread and performing other domestic operations in a convenient and easily-accessible position.

Further, the object of the invention is to provide a kitchen-cabinet having therein receptacles for flour, meal, &c., so arranged as to be easily accessible, and provided with a cover which will readily and easily adjust itself to fit accurately over the receptacles when the latter are not in a position to have their contents removed.

Further, the object of the invention is to provide a kitchen-cabinet of simple and cheap construction which shall be neat in appearance and the interior of which, for containing kitchen utensils, shall be ventilated, capable of being closed to prevent dust and dirt from settling on the articles contained in it, and which at the same time may be easily opened to render the articles accessible, and to provide a mixing-board.

With these objects in view the invention consists of the cabinet constructed substantially as hereinafter described and as specifically claimed.

The invention is illustrated in the accompanying drawings, in which—

Figure 1:
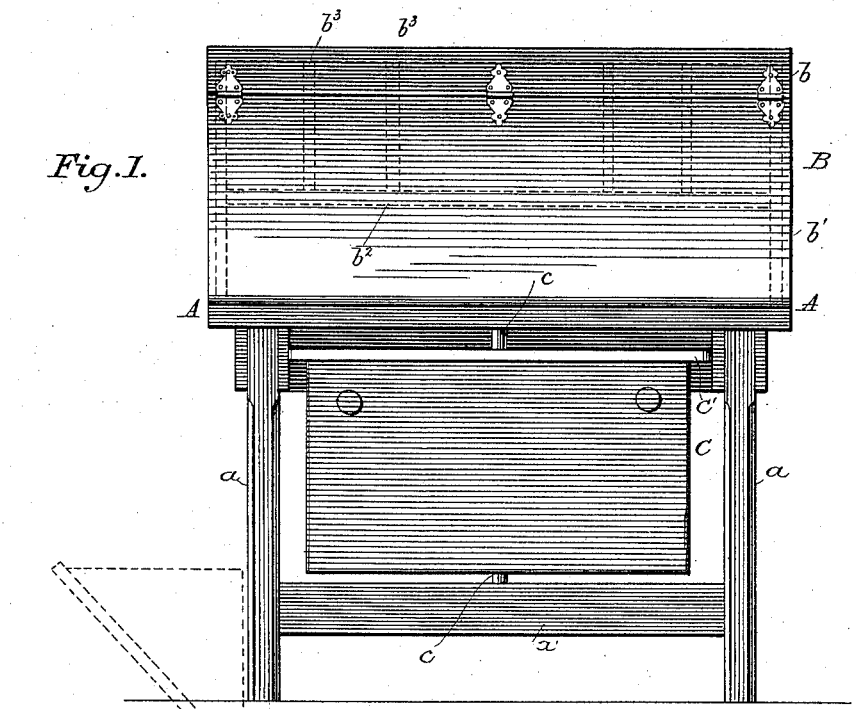
Figure 2:
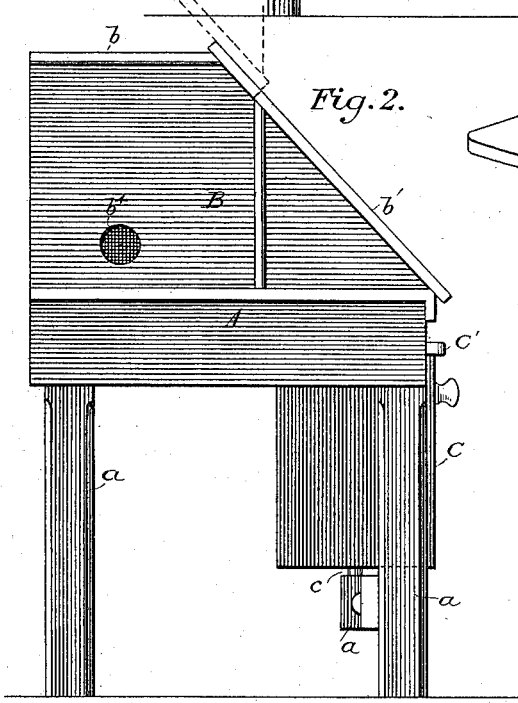
Figure 3:
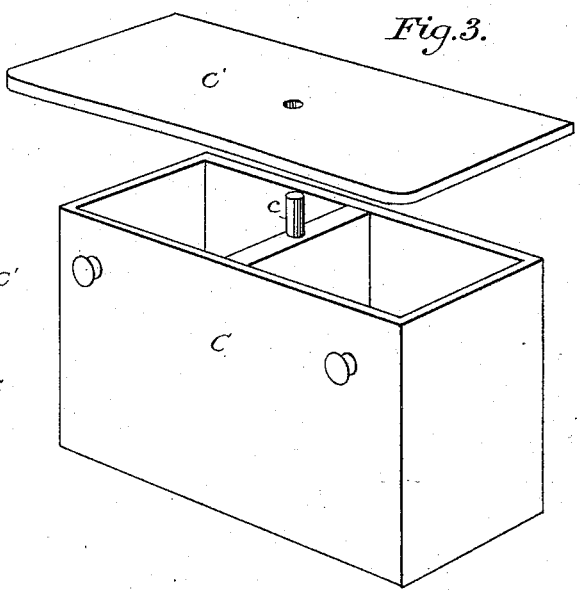

Figure 1 is a front view of a cabinet constructed in accordance with my invention. Fig. 2 is a side elevation showing by dotted lines the movable part of the cover in a raised position, and Fig. 3 is a perspective view of the bin and its receptacle separated from the remainder of the cabinet.

In the drawings, A represents the table portion of the cabinet, which is supported on suitable legs $a$. The table-top is protected by a cover B, composed of the parts $b$ and $b'$. The part $b$ is preferably permanently attached to the table-top, and beneath it is a space for receiving kitchen utensils.

The movable part $b'$ of the cover is hinged to the part $b$ to facilitate its being raised and lowered. When the part $b'$ is in an elevated position, the compartments in the portion $b$ are rendered accessible, and when the part $b'$ is lowered the table-top is completely covered, thus protecting it from dust, dirt, and the like, and also preventing the ingress of insects. The sides in the portion $b$ are each provided with openings $b^4$, covered by wire-cloth, permitting free circulation of air inside the cover when closed and preventing entrance of insects, &c.

C represents a bin which is pivotally mounted on a rod $c$, one end of which extends into an opening in the under side of the table-top, and the other extending into an opening in a cross-piece $a'$, extending between the two front legs of the cabinet. The bin is preferably divided into two or more compartments, adapting it for the reception of flour, meal, or any other desired number of different materials for use in making bread, &c. The size of the bin is such as to permit of its freely rotating on the rod $c$ to move either end from beneath the table-top and thus to allow the introduction and removal of the materials.

Arranged above the bin or receptacle is a cover C'. This cover is not attached to the bin, but simply rests by gravity on the upper edge thereof. The cover is retained from back-and-forth movement by being pierced by the rod $c$, and it is prevented from turning by having square ends, which abut against the straight sides of the frame of the cabinet.

The parts are so arranged that sufficient space is left between the top of the bin and the under faces of the table-top A to permit an up-and-down movement of the cover C', if desired, and to allow the bin to be raised to withdraw the lower end of the pin $c$ from the opening in the cross-piece $a'$, permitting the removal of the bin for cleaning.

By the arrangement described it will be clear that the cover will readily adjust itself to completely close the bin whenever the latter is turned to a position to bring it beneath the cover, and that any inequalities in the material of which the parts are composed will not affect the perfect fit of the cover upon the bins, for the reason that the fit depends solely upon the weight of the cover to seat it.

From the construction described it will be seen that I produce a very cheap, easily-constructed, and useful article of furniture, and one which will answer all the needs of the position for which it is intended without complication of parts or the utilization of any means which are liable to get out of order by use to which the article will ordinarily be submitted.

Having thus described my invention, what I claim as new, and desire to secure by Letters Patent, is—

1. A kitchen-cabinet comprising a bin or receptacle for flour or the like pivotally mounted on a rod seated in the frame of the cabinet, a cover pierced by the rod upon which the receptacle is mounted, the cover being capable of a slight up-and-down movement and being incapable of rotating, substantially as described.

2. A kitchen-cabinet comprising a pivoted bin or receptacle for flour or the like, the bin being divided into compartments, one compartment being arranged at each end of the bin, and being capable of swinging horizontally to expose the different compartments or to cover the same, and a cover arranged above the bin, the cover being capable of slight up-and-down movement, and incapable of rotating, substantially as described.

3. A kitchen-cabinet comprising a table portion suitably supported, a cover for the table portion made in two parts, one of which is movable, a bin for receiving flour or the like arranged below the table portion and divided into compartments, the bin being capable of swinging horizontally, and a cover arranged above the bin, the cover being capable of moving vertically and incapable of rotating, substantially as described.

In testimony whereof I affix my signature in presence of two witnesses.

WILLIAM H. HAIRE.

Witnesses:
J. F. RAY,
M. R. CURREN.